United States Patent [19]

Brooks

[11] Patent Number: 4,865,066
[45] Date of Patent: Sep. 12, 1989

[54] CANOPY ASSEMBLY

[75] Inventor: Jackson R. Brooks, Estes Park, Colo.

[73] Assignee: ABC Extrusion Company, Inc., Fort Collins, Colo.

[21] Appl. No.: 234,518

[22] Filed: Aug. 22, 1988

Related U.S. Application Data

[62] Division of Ser. No. 942,341, Dec. 16, 1986, Pat. No. 4,817,655.

[51] Int. Cl.$^4$ .......................................... E04H 15/34
[52] U.S. Cl. .......................... 135/101; 135/DIG. 9; 52/280; 52/285; 52/726
[58] Field of Search .............. 135/101, 102, 105, 115, 135/119, 9.5, DIG. 8, DIG. 9, DIG. 5; 52/222, 273, 459, 466, 586, 726, 756, 285, 280; 160/392, 395, 391, 399, 402, 403; 403/65, 170, 199, 286, 405.1, 406.1, 407.1

[56] References Cited

U.S. PATENT DOCUMENTS

| | | | |
|---|---|---|---|
| 701,126 | 5/1902 | Bahrmann | 135/106 |
| 3,424,179 | 1/1969 | Minot | 135/119 X |
| 3,572,353 | 3/1971 | Pinkley | 135/115 X |
| 3,791,076 | 2/1974 | Gahler | 135/115 X |
| 3,811,454 | 5/1974 | Huddle | 135/102 |
| 3,851,848 | 12/1974 | Wiele | 248/273 |
| 3,909,994 | 10/1975 | Richter | 135/102 X |
| 4,007,552 | 2/1977 | Brooks | 40/130 R |
| 4,112,643 | 9/1978 | Decker | 52/222 |
| 4,188,764 | 2/1980 | Gode | 52/582 |
| 4,189,880 | 2/1980 | Ballin | 52/202 |
| 4,233,790 | 11/1980 | Meadows | 52/222 |
| 4,234,035 | 11/1980 | Babbs | 160/392 |
| 4,265,039 | 5/1981 | Brooks | 40/603 |
| 4,410,027 | 10/1983 | Locous | 160/380 |
| 4,452,294 | 6/1984 | Fukuchi | 160/395 |
| 4,649,947 | 3/1987 | Tury et al. | 135/DIG. 9 X |

FOREIGN PATENT DOCUMENTS

| | | | |
|---|---|---|---|
| 841277 | 5/1970 | Canada | |
| 2503643 | 8/1976 | Fed. Rep. of Germany | 135/119 |
| 7906086 | 2/1980 | Netherlands | 135/119 |

Primary Examiner—Carl D. Friedman
Assistant Examiner—Caroline D. Dennison
Attorney, Agent, or Firm—Hugh H. Drake

[57] ABSTRACT

A canopy assembly includes a frame composed of a plurality of elongated elements interconnected to form an array to which a fabric is secured and stretched. Portions of the fabric are secured in tension into corresponding different ones of the elements, and corresponding ends of respective elements are connected together to form the frame. At least some of the elements each respectively have an H-shaped cross-section with space-opposed pairs of each of mutually-spaced legs projecting individually away from respective opposite ends of the crossbar of that cross-section. A variety of different devices may be used alternatively to secure the portions of fabric to the different elements, while creating tension in the fabric. A number of different interconnectors may be used alternatively or in various different combinations to connect corresponding ends of respective different elements in the formation of the frame. Different ones of those devices and interconnectors also are described in use with channel-shaped elements rather than H-shaped elements.

38 Claims, 9 Drawing Sheets

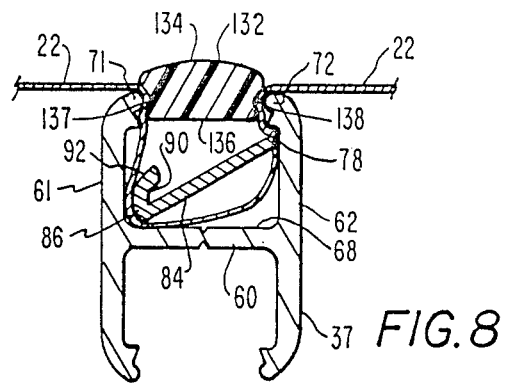
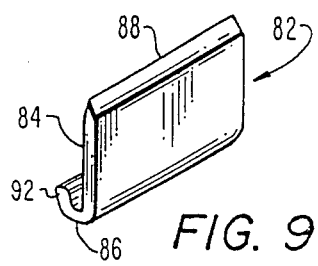
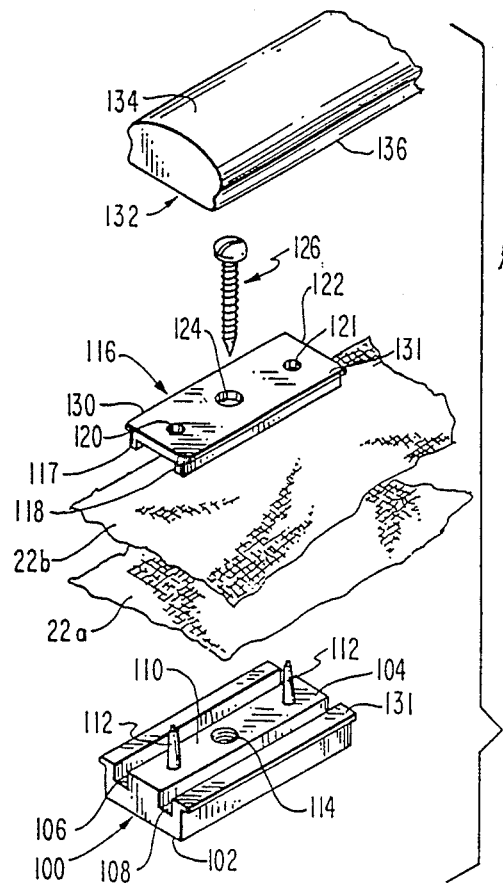
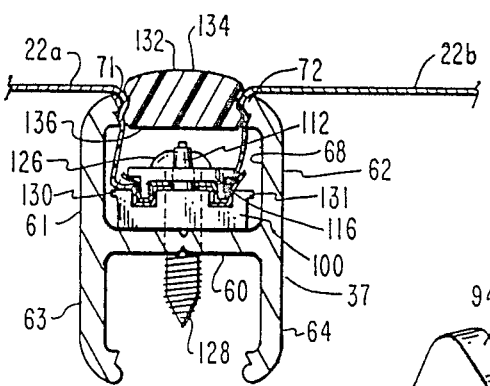
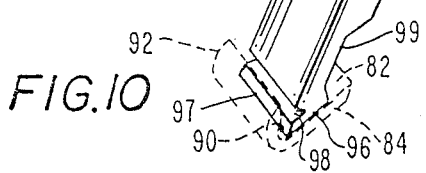

CANOPY ASSEMBLY

This is a division of parent application Ser. No. 942,341, filed Dec. 16, 1986, U.S. Pat. No. 4,817,655 and assigned to the same assignee as the present application.

SPECIFICATION

The present invention relates to a canopy assembly. More particularly, it pertains to a unique frame member with which a number of different assembly components may be selectively used and arranged in order to permit the formation of canopy frames in any one of a wide variety of different shapes of the assembled canopy.

Awnings and various other canopies in a wide variety of sizes and shapes have long been known. Often, they involve the assembly of some kind of structural framework over which a fabric, such as canvas, is stretched. Typically, the marginal edge portions of the fabric are wrapped around a frame element and sewn back against themselves or grommets and lacing are used. At least in more recent years, some forms of canopies have been formed by using a framework in which are seated rigid panels of sheet metal or, as it became available, rigid sheet plastic.

Also over a long period of time have been developments in the display sign art. Sheets of metal, glass, possibly even fabric and, later, rigid plastic often were secured in a framework which sometimes was multi-pally paneled and may even have had a three-dimensional presentation. Some display signs may even have had a shape such that they also served as a canopy. Of course, lettering or illustrations were usually painted, printed or otherwise placed upon the surface of the sign.

With glass and rigid plastic, the sheets sometimes were transparent or, even more usually, were translucent. Those sign panels then frequently were illuminated from behind or from within a cabinet so that the viewer observed a silhouette of the image on the sign. With the use of translucent paints or inks, the display frequently was in color. One example of such a rigid-faced display sign was disclosed in applicant's U.S. Pat. No 4,007,552.

More recent development has led to the availability of a translucent, flexible fabric of a plastic in which is imbedded a mesh of threads made from a material such as Dacron which also is somewhat translucent. This newer material eventually suggested its use in display signs. As before, the material could be imprinted with various words and designs as well as in a combination of colors, and the use of backlighting usually was contemplated. The fabric was tough, could be stretched in tension and overcame many earlier problems such as damage caused by wind forces that had plagued rigid-faced plastic sign faces.

With regard to display signs, a number of patents issued which suggested a variety of different approaches to enable the mounting and tensioning of the fabric with respect to a supporting sign framework. A representative and very successful approach to solving several different problems was disclosed and claimed in U.S. Pat. No. 4,265,039.

Apparently later, the aforementioned flexible plastic fabric also was adopted for use by what had primarily been a separate industry. It produced canopies such as awnings and umbrella-shaped structures. In at least some cases, backlighting was incorporated into those canopies in order to achieve desired visual effects. In some cases, letters and/or designs also were imprinted upon the fabric material, so that the canopy served the additional function of in part being a display sign.

In a sense, two different industries had merged at least in part, sharing and having to overcome some of the same problems, such as durability of printing materials and a desire for improvements in devices for tensioning the fabric and securing its margins. On the other hand, the construction of canopies has presented many additional problems not all of which have been satisfactorily overcome. This arises because the shape of a canopy might advantageously vary widely from one canopy to the next, depending upon the function to be served or just the aesthetic effect sought by an imaginative designer. One problem, in attempting to devise the components necessary for the formation of a variety of framework shapes, is to provide for flexibility in design while not yet requiring the necessity of manufacturing and stocking an excessive variety of different components.

Accordingly, it is a general object of the present invention to provide a new and improved approach to the provision of framework assemblies for canopies, satisfying one or more of the problems mentioned above or meeting new challenges presented.

Another object of the present invention is to eliminate the sewing or seaming of fabric covers as heretofore often has been employed, by enabling the fabric panels to be separately drawn into any frame member and held in tension thereto.

A further object of the invention is to enable use of what may be a single frame element and yet which can result in the fabrication of canopies in any of a wide variety of possible sizes and shapes.

One specific object of the present invention is to provide a new and improved frame element which may be accurately rolled to different shapes of various radii, while maintaining both its strength and formed shape.

Another specific objective is to provide frame components which exhibit substantial strength in relation to their size and weight, while yet being economical to produce.

Still another object of the present invention is to provide components which are capable of handling translucent vinyls as used in backlighted canopies and yet casting only a minimum of shadow caused by the frame components.

A still further object of the present invention is to provide new and improved means for tensioning two separate but adjacent fabric panel margins, while yet enabling adjustment in tension as well as smoothing out to eliminate wrinkles, thereby eliminating pattern-making, sewing and seaming.

Yet another object of the present invention is to achieve the foregoing while yet employing a frame assembly the components of which can be separately formed and with all of the parts being capable of being shipped to a job site as disassembled from the ultimate framework assembly or as a kit.

It is a related object of the present invention to provide a number of different framework components not only finding advantageous use in connection with canopies but also applicable for use in the construction and assembly of display signs and other apparatus over which a flexible fabric is stretched in tension.

In accordance with one aspect of the present invention, an assembly includes a frame composed of a plurality of elongated elements interconnected to form an array to which a fabric is secured and stretched. Portions of the fabric are secured into corresponding different ones of the elements, and tension is induced in the fabric. Corresponding ends of respective ones of the elements are interconnected by couplings so as to form the frame. In a preferred version, at least some of those elements each respectively have an H-shaped cross-section with space-opposed pairs of mutually-spaced legs projecting individually away from respective opposite ends of the crossbar of that cross-section. In another implementation, at least certain of those elements may be of a simpler U-shaped cross-section. Other more detailed and varied aspects of the present invention pertain to a number of different securing and interconnecting components.

The features of the present invention which are believed to be patentable are set forth with particularity in the appended claims. The organization and manner of operation of the invention, together with further objects and advantages thereof, may best be understood by reference to the following description of one specific embodiment, and several variations thereof, taken in connection with the accompanying drawings in the several figures of which like reference numerals identify like elements and in which:

FIGS. 1a through 1j schematically illustrate a variety of different framework shapes which represent only some of the possible corresponding forms which a canopy may take;

FIG. 8 is a fragmentary cross-sectional view of one form of fastener which may be utilized in assembly of the canopy;

FIG. 9 is an isometric view of a fastener component shown in FIG. 8;

FIG. 10 is an isometric view of a tool preferred for lodging and dislodging the fastening component shown in FIG. 9 as assembled in FIG. 8 and with the fastener component illustrated in phantom;

FIG. 11 is an end elevational view of an alternative fastener used in connection with an element of the canopy;

FIG. 12 is an exploded isometric view of the fastener components shown in FIG. 11.

FIGS. 1a–1j illustrate but a representative sampling of the wide variety of shapes which a canopy framework might take. In each case, it will be recognized that the ultimate canopy will involve covering that framework with a fabric. It will be appreciated that couplings are necessary in order to interconnect the different elements.

Figure 1A:
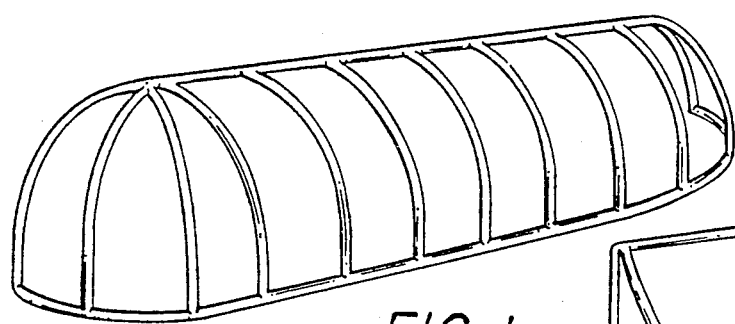

FIG. 1a uses a combination of curved and straight frame elements for a canopy which may be made as long as desired to cover, for example, the windows and entrance of a store front.

Figure 1B:
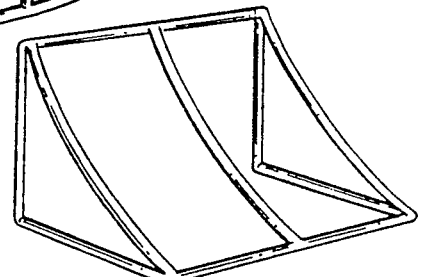
Figure 1C:
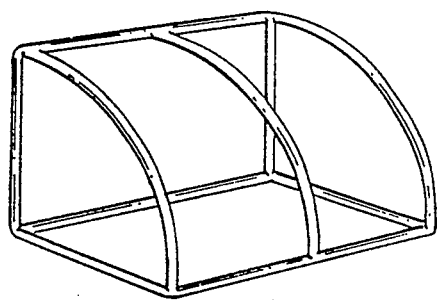
Figure 1D:
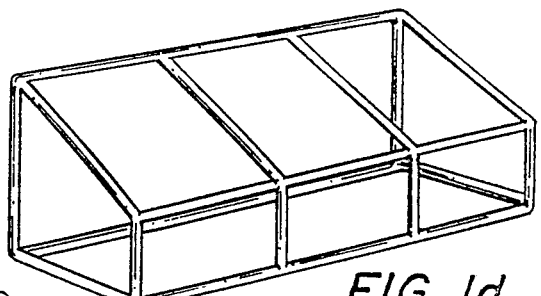

FIG. 1b illustrates a rather common shape of awning which may cover a window or be elongated to cover an entire storefront. The construction is such that a valance also may hang downwardly. FIG. 1c depicts an awning which has the rising elements curved in a direction opposite that of FIG. 1b. FIG. 1d is for a different awning the valance portion of which is actually tightly supported.

Figure 1E:
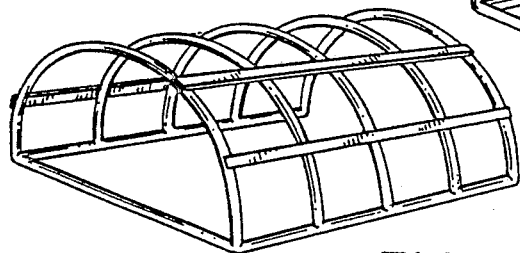

FIG. 1e shows a framework which might be desired for covering a long entrance walk leading to a building. Alternatively, it may constitute the structure to form a tent-like shelter.

Figure 1F:
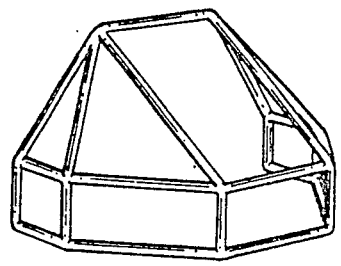
Figure 1G:
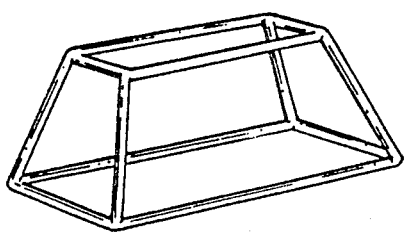

FIGS. 1f and 1g similarly depict still further configurations which might be employed for constructing either awnings or covering canopies.

Figure 1H:
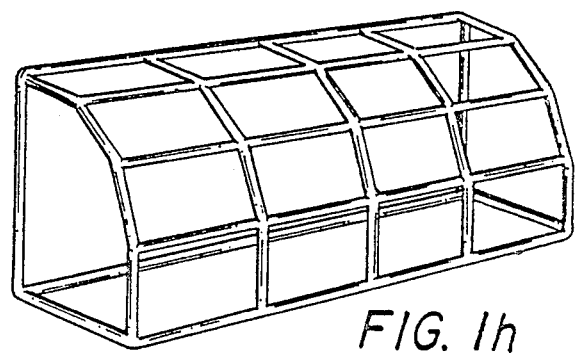

FIG. 1h shows an arrangement which has been used over individual windows spread throughout the front of a hotel, while a modified longer version serves as a canopy over an open stairway.

Figure 1I:
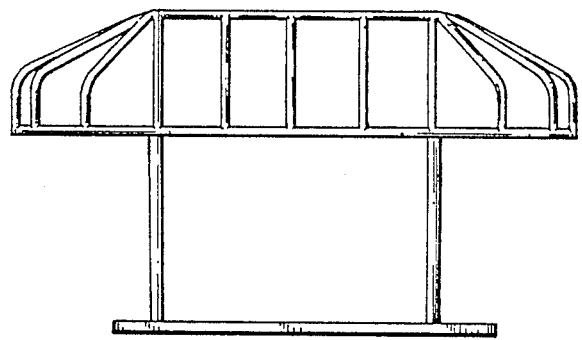
Figure 1J:
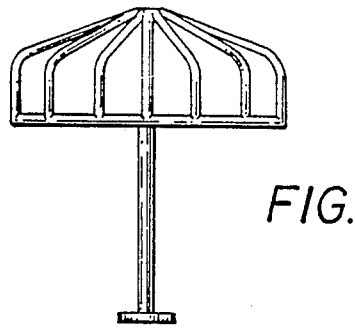

FIG. 1i would be suitable, for example, as a canopy to cover the fuel pump island of a gasoline service station. Finally, FIG. 1j could be for use as an umbrella disposed above a circular table employed for dining.

Actually, the variety of different shapes of and purposes to be served by a canopy may be limited in number only by the scope of the imagination of an artistic designer. Unless the framework is especially made by the use of custom bending and interconnecting of different portions of the framework, the variety of shapes is generally limited to selection from among a catalog of variations and alternatives in different components.

Figure 2A:
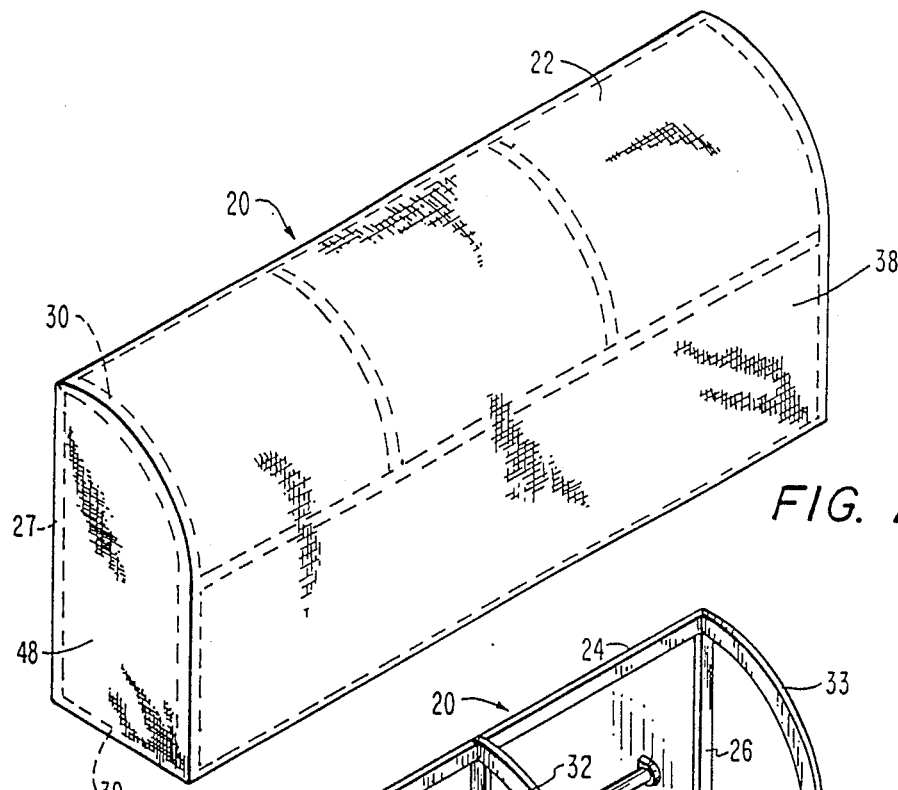
FIG. 2a is an isometric view of a canopy covered with a flexible fabric.
Figure 2B:
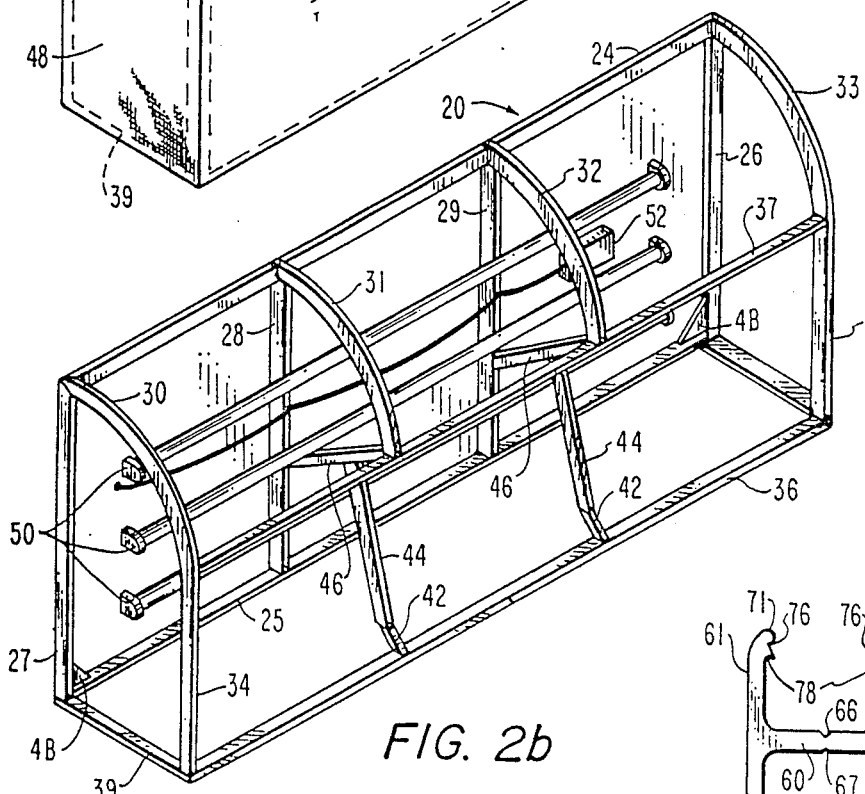
FIG. 2b is a view similar to FIG. 2a but with the fabric removed to enable viewing of certain internal components in part only fragmentarily presented.

FIGS. 2a and 2b illustrate a canopy assembly 20 that, as to overall shape, is one more example of a known configuration. The frame is composed of a plurality of elongated elements interconnected to form an array to which a fabric 22 is secured and stretched thereover. At the rear is a rectangular structure, usually mounted to a building wall, which includes intercoupled horizontal elements 24 and 25 joined at corresponding ends by vertical elements 26 and 27 as well as by intermediate bracing elements 28 and 29.

Curving downwardly and outwardly from spaced locations along the length of element 24 are additional elements 30, 31, 32 and 33. Endmost elements 30 and 33 either themselves continue straight downwardly or are connected to further straight elements 34 and 35 which are then connected to the ends of a lower horizontal front element 36. In this case, elements 31 and 32 curve downwardly only to interconnection with an upper horizontal element 37 which is joined at its ends also to elements 30 and 33. Thus, the lower front panel 38 of the canopy is flat. Completing the basic frame are lower side elements 39 and 40.

In this particular case, where it happens to be desired to have front panel 38 free of any elements disposed immediately behind the fabric of that panel, and perhaps also for additional rigidity of the overall canopy particularly when it is rather large, internal bracing is employed. As here shown, that bracing includes horizontal struts 42 projecting inwardly from element 36 and to the inner ends of which are joined vertical struts 44 which connect to an intermediate portion of lateral struts 46. Struts 46 connect between the respective lower ends of elements 31 and 32 as well as at the other end to vertical elements 28 and 29. Especially in the case of a sign of large dimensions, and in order to add strength as against skewing of the vertical elements relative to the horizontal elements, corner bracing may be added as shown at 4B.

In this case, the opening in the frame at the bottom of canopy 20 could be left open to allow floodlighting of the area below the canopy which might be a sidewalk. Preferably, that bottom area is covered with a panel of either transparent or translucent material in order at least to shield against the entry of moisture and also desirably to conceal the internal components from public view.

In this instance, fabric 38 may lead from upper rear element 24 as a continuous piece all of the way to lower front element 36. On the other hand, it may be separated into several different panels joined together by curved elements 31 and 32 and also at upper horizontal element 37 in order to achieve a mixed color pattern, accommodate available fabric sizes or facilitate installation of the fabric. Fabric end panels as at 48 would in this case desirably be cut and installed separately in order to avoid gathering along the curved elements.

As indicated, this particular canopy is intended to be internally illuminated. This is illustrated by the inclusion in FIG. 2b of a plurality of vertically-spaced horizontal fluorescent tubes 50. The details of the mounting of the flourescent tubes need not be shown, because their support in appropriate individual locations are now well known in the sign art for internal illumination of display panels. It will suffice to say that there will be included a connector strip at each end of the bank of tubes 50 with those connector strips mounted to the building wall or to different ones of the rear elements of the frame. Similarly, a conventional ballast 52, that supplies energy to those connector strips, may be located anywhere convenient and preferably toward the rear of the frame.

While the arrangement for the illumination is conventional, more will be discussed below in terms of preferred spacings. Instead of the use of a series of spaced fluorescent tubes disposed interiorally of the frame, one alternative is to locate an upwardly open soffit along the lower rear edge of the framework. The illumination elements are then located within the soffit so as to flood the interior of the sign.

Figure 3A:
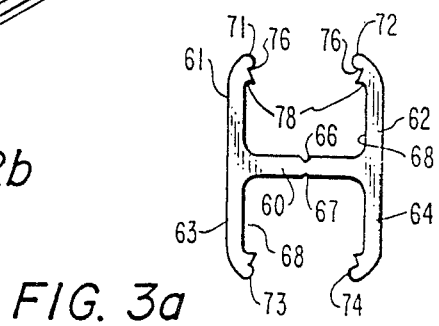
FIG. 3a is a cross-sectional view of a principal element utilized to form the framework of the canopies shown in FIGS. 2a and 2b.
Figure 3B:
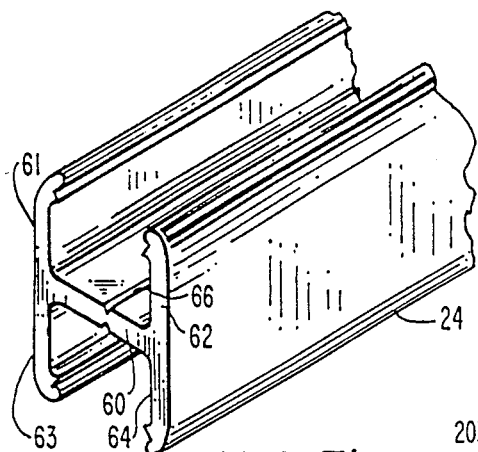
FIG. 3b is a fragmentary isometric view of that element

Preferably, all of the different elements are formed to have an H-shaped cross-section as shown for element 24 in FIGS. 3a and 3b. The same structural stock also may be used for internal bracing as in the case of struts 42-46. However, some of the elements may be of simpler cross-section and, particularly for internal bracing, fabricated of simple bar or tube stock. Nevertheless, the H-shaped cross-section is preferred for the reason that it exhibits a high level of strength against bending in any direction for its size and weight as contrasted with the use of other cross-sections which also would be simple to extrude. Yet, elements formed with the H-shaped cross-section are easily rolled in order to obtain a curvature about crossbar 60 of the cross-section to a selected degree of curvature of a desired radius which may vary over a substantial range.

It will be observed that this cross-section defines oppositely facing pairs of mutually-spaced legs 61 and 62 forming one pair and legs 63 and 64 forming another pair. Legs 61 and 63 project in opposite directions from one end of crossbar 60, and legs 62 and 64 project in opposite directions from the other end of crossbar 62. Formed centrally to run lengthwise of crossbar 60 are oppositely facing small grooves 66 and 67 which are useful as drill or tap guides for installing sheet metal screws or other fasteners in order to mount components yet to be described. Each mutually-spaced pair of legs together with crossbar 60 define an outwardly-opening cavity 68.

Although not necessary for the purpose of using all components yet to be described for either securing of the fabric or interconnection of the elements, it is preferred that all elements be formed in the manner depicted in FIGS. 3a and 3b, both for purposes of economy as well as reduction of parts inventory. Thus, the outer end portion of each of all of the legs are formed to bend inwardly to form feet 71, 72, 73 and 74. Feet 71 and 72 of legs 61 and 62, respectively, face one another, and the same thing is true with regard to feet 73 and 74 of respective legs 63 and 64.

Each foot in this case has its inward face shaped to define a pair of notches as at 76 and 78 spaced successively inward from the end of the corresponding leg. It can be observed that the innermost notches 78 also define downwardly-facing shoulders, downward being used in the sense of toward crossbar 60 no matter what the actual orientation of the element.

Turning next to FIGS. 8 and 9, an arrangement is shown for securing fabric 22 to one of the elements such as element 37. Seated within cavity 68 defined by legs 61 and 62 together with crossbar 60 is a J-shaped resilient clip 82 which has a longer leg 84 the length of which is greater than the width of cavity 68 between legs 61 and 62. Clip 82 is seatable within cavity 68 upon flexure of clip leg 84 while the bottom 86 of clip 82 is disposed in the corner of cavity 68 defined by the junction between leg 61 and crossbar 60. When seated, the free end of clip leg 84 is lodged against and beneath shoulder 78.

Thus, clip 82 constitutes a clamp seated within cavity 68 with a portion of fabric 22 disposed around and beneath that clamp. In addition, the shape of clip 82 together with the necessary manner of its insertion and seating serves to induce tension in fabric 22 as the clip is emplaced.

As specifically shown in FIG. 8, clip 82 is employed to secure in tension an intermediate portion of a length or width of fabric 22. Alternatively, clip 82 may be employed to seat and tension edge margins of separate panels of fabric 22. In that case, the fabric entering over foot 71 is disposed below bottom 86 and then around and upwardly so as to be engaged by the free end of leg 84 and pressed against shoulder 78. At the same time, the marginal edge portion of another panel of fabric 22 arriving from the opposite direction is inserted over foot 72 and ends up being disposed first around that free end of leg 84 and then led beneath bottom 86 and terminated above clip 82. Accordingly, this results in an overlapping of the marginal edge portions at the same time as they are clamped within cavity 68. Preferably, the free end of longer leg 84 of clip 82 is tapered to define a narrow edge 88 which increases the securement while yet not being sufficiently sharp to cut through fabric 22.

For conveniently seating clip 82 within cavity 68, a useful tool 88 is shown in FIG. 10. Tool 88 is engaged into the bight 90 between longer leg 84 and the shorter leg 92 of clip 82, so that the tool may be levered downwardly against the central portion of leg 84. Tool 88 takes the form of an elongated bar 94 having one end surface 96 slanted with respect to the axis of elongation of bar 94. Defined inwardly from the tip 97 of end surface 96 is a notch 98 spaced inwardly from tip 97 by a distance which enables tip 97 to be inserted into bight 90 with shorter leg 92 lodged within notch 98. Also included in the surface of bar 94 on its rear side is a channel 99 generally opposite notch 98 and of a length along bar 94 sufficient to enable levering of the bar over, in this case, foot 72 of leg 62 and thereby permit seating or unseating of clip 82 from its locked position within cavity 68.

As is the case also of alternative securing components yet to be described, the width of clip 82 is short compared to the length of element 37. During installation, a plurality of clips 82 are successively spaced along that length. This permits the smoothing out of fabric 22 along the length of element 37 as the fabric is being installed and tensioned, thereby enabling the installer to remove wrinkles in the fabric which tend to form. Usually, the installer will initially insert the clip into place and secure a central portion of fabric 22. Then, while successively installing additional ones of clips 82, he will smooth out the fabric along the length of the element.

An alternative form of securing clamp is shown in FIGS. 11 and 12. In this case, the clamp includes an elongated base 100 having a bottom surface 102 seatable against crossbar 60 of element 37. Running lengthwise on the upper surface 104 of base 100 are a pair of laterally-spaced grooves 106 and 108 separated by a land 110 also running lengthwise in end top surface 104.

Means defining a pair of pedestals 112 are, as shown, spaced along and project from land 110, and a hole 114 is formed into land 110 in a position intermediate the pedestals. The actual clamp element is an elongated U-shaped cleat 116. The individual legs 117 and 118 seat within respective ones of grooves 106 and 108 to clamp different portions 22a and 22b of the fabric against top-surface 104 and into grooves 106 and 108. A pair of openings 120 and 121 are formed through and spaced apart along the length of the bight 122 of cleat 116 to fit individually around respective ones of pedestals 112.

An aperture 124 is defined through bight 122 in a position to be in alignment with hole 114. A fastener 126, in this case a metal screw having a sharp point 128, is enabled to project from the outer surface of bight 122 through aperture 124, marginal portions of 22a and 22b of the fabric and into crossbar 60. Point 128 is sufficiently sharp to pierce the fabric portions through which it passes. As shown, cleat 116 preferably also includes a pair of wings 130 and 131 individually projecting laterally outward from respective ones of legs 117 and 118 of cleat 116 in a position to additionally clamp fabric portions 22a and 22b against the respective outer portions of top surface 104 of base 100 which are outward from grooves 106 and 108.

As in the case of the version of FIG. 8, base 100 and cleat 116 are of lengths short compared to the length of element 37, so as to be insertable within cavity 68 in spaced succession along the length of element 37 and enable the smoothing out of wrinkles as the fabric is installed. In use, the respective marginal edge portions of fabric panels 22a and 22b are overlapped while cleat 116 is pressed over the fabric and into grooves 106 and 108 after which piercing screw 126 is then inserted into crossbar 60 in an amount sufficient to achieve the desired tension.

Following a chart which tabulates the degree of tension induced in the fabric of a given material for a given span, marginal edge portions of the fabric may be pre-marked with a visible line to allow the installer to observe when sufficient tension has been induced to dispose the line at a reference point such as the upper inside edges of feet 71 and 72. A similar line may be drawn across the fabric marginal-edge portions to indicate the position at which the fabric portions are engaged by legs 106 and 108 of cleat 116 as the fabric is installed, cleat 116 is implaced and fastener 126 is caused to pierce the fabric. The similar use of such visible lines may be employed with respect to tensioning relative to feet 71 and 73 in the version of FIG. 8.

Although the preferred arrangement is as illustrated, it should be noted that pedestals 112 might be formed in cleat 116, while apertures 120 and 121 are reciprocally formed instead in land 110 of base 100. In either case, pedestals 112 are shaped at their free ends 130 to be sufficiently sharp in order also to pierce the fabric being clamped as cleat 116 is pressed toward base 100.

As shown in FIGS. 11 and 12, the marginal edge-portion of fabric panels 22a and 22b are overlapped beneath the clamp as also was discussed in connection with the version of FIG. 8 as one variation. Reversely, the clamp of FIGS. 11 and 12 may also be employed simply to tension a continuous sheet of the fabric like that shown in FIG. 8.

It also may be noted that, for the employment of the fasteners of FIGS. 11 and 12, it is not necessary that the feet or outer ends of legs 61 and 62 bend mutually-inwardly to define feet 71 and 72. Instead, the outer ends of legs 61 and 62 may simply form straight side walls of what becomes a U-shaped channel the bottom wall of which is shown here as crossbar 60. However, the illustrated shape, including the H-shaped cross-section and the formation of the feet as well as the inclusion of the notches on the inside faces of the feet, desirably still is included in view of the substantially increased strength of that particular cross-section as well as in cooperation with other elements yet to be described.

As an example of one such other element, the versions of both FIGS. 8 and 11 further include an elongated welt 132 formed of a resilient material to have a cross-section which defines a plug having a cap 134 and a shank 136. Cap 134 has a lateral dimension sufficient to have its opposing margins overlie respective ones of feet 71 and 72, while shank 136 is sized to enable its insertion to form a snug fit between feet 71, 72 and with its free end portion expanded behind or, as shown, below those feet. Desirably, welt 132 includes space-opposed respective depressions 137 and 138 which engage the corresponding different ones of feet 71 and 73.

Of course, welt 132 is installed last and serves not only as a moisture seal but also to complete an aesthetically attractive external appearance. Even when the other mutually-spaced pair of legs 63 and 64 are not directly employed in connection with securing a panel of fabric or cooperating with a coupling, and the opening between those legs is exposed in the ultimate canopy, another length of welt 132 may be employed to aesthetically close that opening. As a further alternative with either version, it may be noted that either may be employed in connection with the installation of a single fabric panel which arrives only from one side of the element, as when an element is at a corner or edge of the frame.

Figure 13:
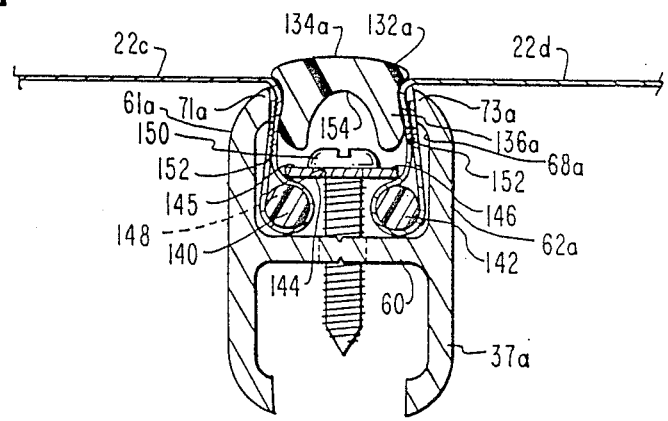
FIG. 13 is an end elevational view, partly in cross-section, of a still different fastener component.

One still further version of a securing and tensioning clamp arrangement is shown in FIG. 13. Here, a slightly different form of the H-shaped cross-section of element 37a is shown for the purpose of illustration without the inclusion of notches 76 and 78. As discussed above, their presence will in no way interfere with allowing the alternative use of this fastener with exactly the same extruded element as depicted in FIGS. 8 and 11. For that matter, the in-turned portions of legs 61a and 62a also are not needed in this version, although, once again, the use of a standardized extrusion is preferred for economy and minimization of inventory.

In the version of FIG. 13, a pair of elongated cylindrical welts or resilient, flexible strips 140 and 142 individually are disposed in respective different corners between crossbar 60 and legs 61a or 62a. A washer 144 is sized so that its lateral end portions 145 and 146 may be disposed to overlie the respective ones of welts 140 and 142, thereby enabling the clamping of portions of fabric panels 22c and 22d between at least one of welts 140 and 142 and crossbar 60. A hole 148 is disposed centrally in washer 144 between end portions 145 and 146 in receipt of a fastener 150 which projects through that hole and into crossbar 60. As shown, the respective marginal edge portions of fabric panels 22 and 22d are wrapped around corresponding ones of welts 140 and 142 and then disposed back against themselves to define a common region 152 over which the two layers of fabric are bonded by machine or hand tool, sewn, glued or otherwise joined.

Washer 144 may be either circular or, preferably, in the form of a short, flat bar with the bar only resting in a position such that its edge portions overlie the welts. The marginal edge portions of the fabric again may be smoothed out to eliminate wrinkles. As before, a continuous fabric panel may be emplaced within cavity 68a, so as to run successively under welts 140 and 142 and then be pierced by fastener 150. Or respective marginal edge portions of panels 22c and 22d may instead be arranged to overlap and also be pierced by fastener 150. In one less desirable variation, washer 144 may be in the form of a continuous bar.

As specifically shown in FIG. 13, welt 132a is similar to that previously discussed in having a cap 134a and a shank 136a. In this case, the free end portion of shank 136a is formed to include a recess 154 in order better to accommodate the head of fastener 150, if necessary, as well as to increase the tendency of the lower end portion of shank 136a to spread apart once inserted beyond the entrance to cavity 68a. It will thus be seen that there is made possible an interchangeablity of the various different specific concepts discussed in connection with each of FIGS. 8, 11 and 13.

In all cases, internal illumination within the interior of the canopy tends to have the formation of shadows minimized by the "spilling" of light at a forty-five degree angle to the opaque press-in welt 132 or 132a. In itself, that welt may be rendered either obvious or inconspicuous by choice of its shape and color.

Figure 4D:
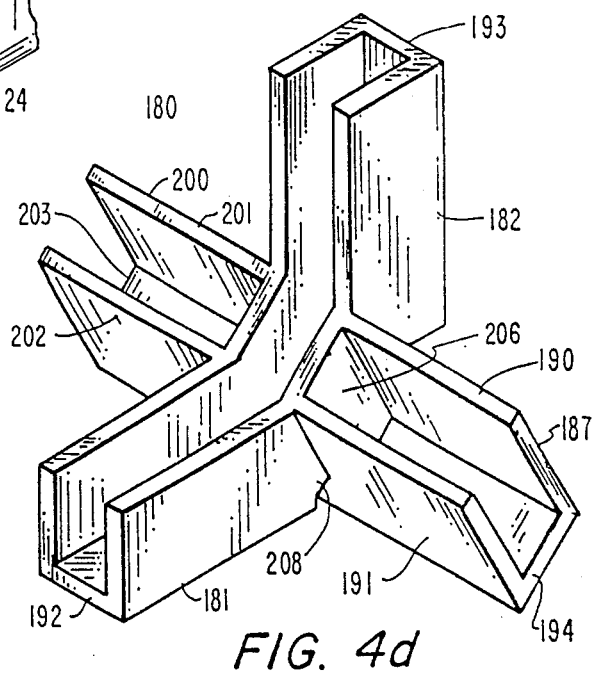
FIG. 4d is an isometric view of a different coupling.
Figure 4E:
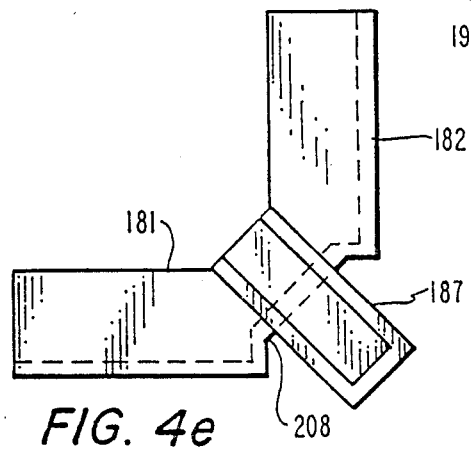
FIG. 4e is an end view of that coupling.
Figure 4F:
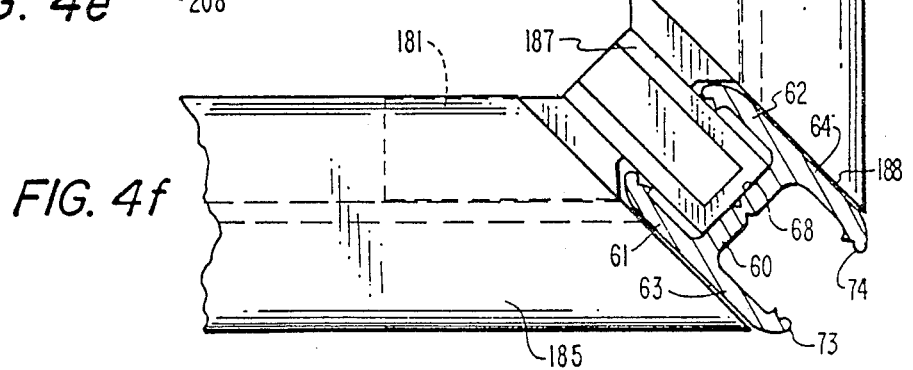
FIG. 4f is also an end view of that coupling but to which interconnected frame elements have been added and one of which is shown in cross-section.
Figure 4A:
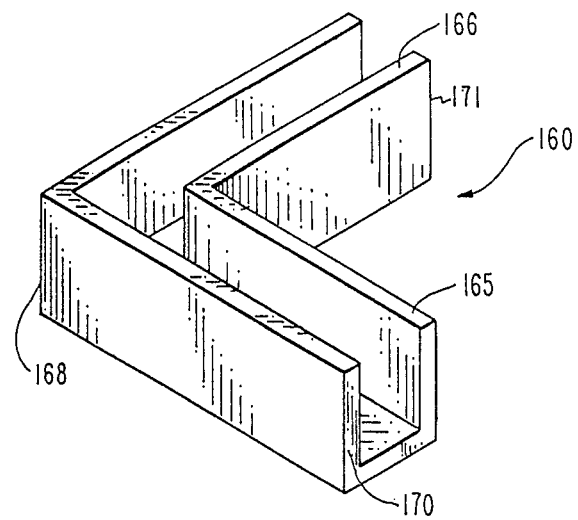
FIG. 4a is an isometric view of a component which may be employed in a coupling for the canopy framework.
Figure 4B:
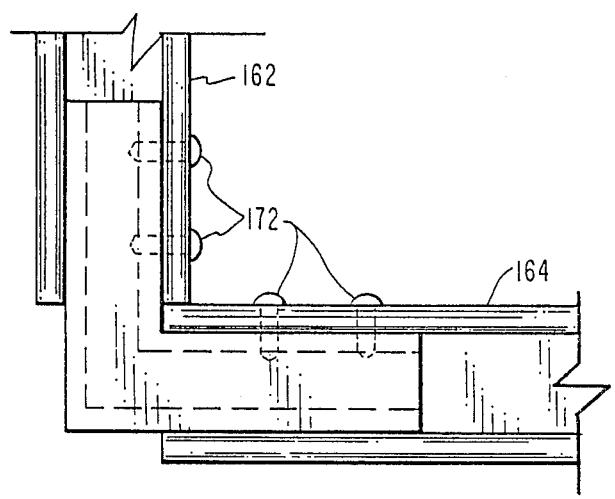
FIG. 4b is a bottom view of that shown in FIG. 4a with interconnected elements having been added.
Figure 4C:
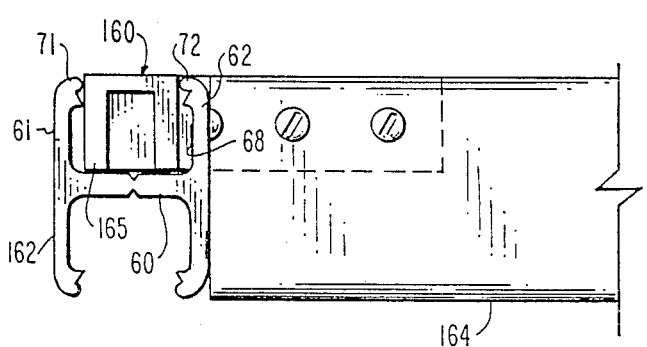
FIG. 4c is a side view of that shown in FIG. 4b.

Referring back in the drawings, FIGS. 4a–4c illustrate a simple right-angle coupling or connector 160. Connector 160 may be employed to interconnect the adjacent ends of two frame elements 162 and 164 in this case disposed mutually at a right angle one to another, although that angle could be other than ninety degrees. Such a coupling is not necessary in the particular frame shown in FIGS. 2a and 2b but advantageously may be used in any frame wherein there is a simple two-way corner such as at the lower rear corners of the frame schematically depicted in FIG. 1b.

As shown, connector 160 is composed of first and second elongated channel-shaped members 165 and 166 with one end of member 166 joined to one end of 165 at 168, so that the longitudinal axis of members 166 and 168 mutually define an angle therebetween. End portions 170 and 171 respectively of members 165 and 166 are conformed in size and shape to seat within the outwardly-opening cavity, as at 68, defined between the corresponding pairs of mutually-spaced legs of the related end portions of individual ones of elements 162 and 164. Fasteners 172, such as self-tapping screws, are inserted through a leg 61 or 62 of each of elements 162 and 164 in order to fasten together the respective element end portions and the channel members.

As illustrated, connector 160 is in the form of U-shaped channels open at one end, and that open end is disposed against crossbar 60. Though unnecessary, connector 160 might be formed as an enclosed square tube. In a less desired alternative, connector 160 could be composed with its members 165 and 166 formed of solid bar stock. Although equivalent for interconnection purposes, that is not preferred, because the formation of a hollow channel enables the connector to be lighter in weight and yet provides substantial resistance against bending, even equally as strong if connector 160 is formed as a closed tube.

Figure 6A:
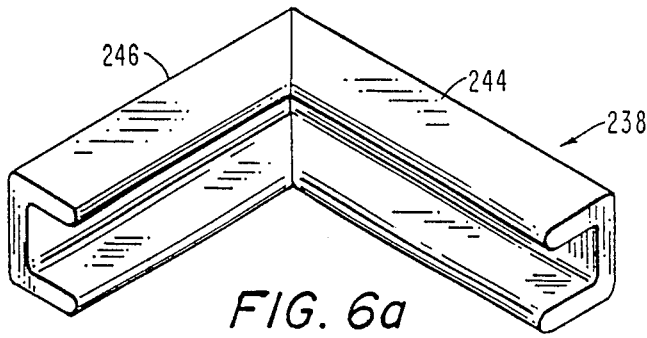
FIG. 6a is an isometric view of a first component used in yet another coupling.
Figure 6C:
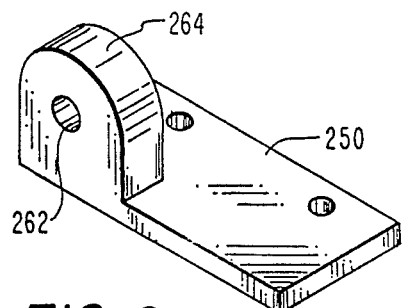
FIG. 6c is an isometric view of a third component employed in that coupling.
Figure 6B:
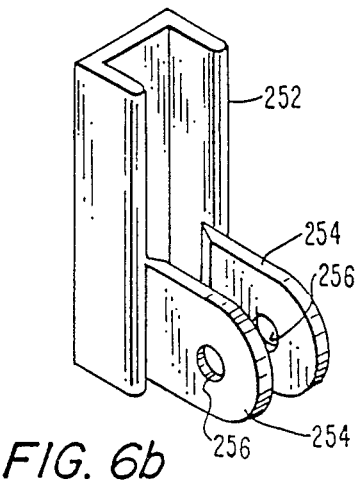
FIG. 6b is an isometric view of a second component used in that coupling.
Figure 6D:
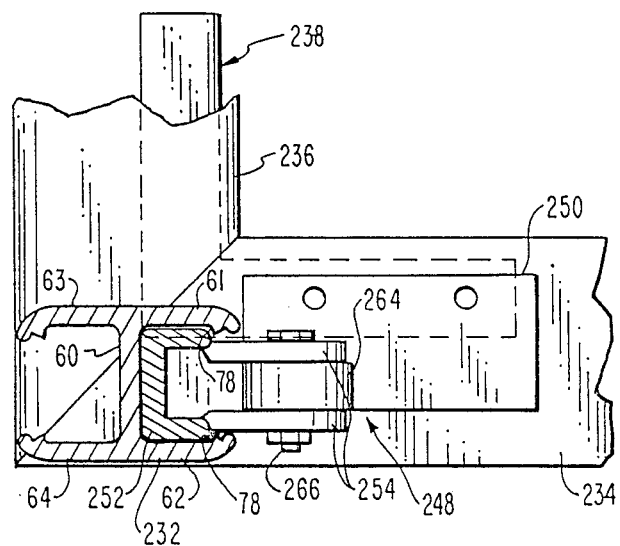
FIG. 6d is a plan view of the component of FIG. 6c as assembled to the components of FIGS. 6a and 6b, with a portion of the component of 6a taken in cross-section and with the resultant assembly of the components interconnecting three different frame elements two of which are shown fragmentarily and one of which is taken in cross-section.

Also as shown, members 165 and 166 are sized to be seated within respective ones of cavities 68 with the bottom wall of the channels defined in members 165 and 166 aligned adjacent to the outer ends of feet 71 and 72. In an alternative shown later in connection with FIG. 6d, channel members 165 and 166 instead may be shaped to have shorter side walls and a wider bottom wall in order to seat beneath and be captivated by shoulders 78.

Expanding from the simple corner angle just discussed, FIGS. 4d–4f depict what may generally be considered to be a triaxial connector or coupling 180. Here again, first and second elongated channel-shaped members 181 and 182 are each joined at one end to the other in order form a mutual angle therebetween as well as to lie in a common plane. As before, members 181 and 182 are conformed in size and shape to seat within the cavities 68 defined between respective end portions of interconnected elements 184 and 185 each of the above-described H-shaped cross-section.

Also included in connector 180 is a third elongated channel-shaped member 187 joined at one end to one end of each of members 181 and 182, so as to project laterally away from the aforementioned common plane defined by the first and second members. Once again, the outer end portion of member 187 is conformed in size and shape to seat within another cavity 68 defined between another pair of legs 61 and 62 of yet another elongated H-shaped element 188.

It will be observed that the side walls 190 and 191 of member 187 are disposed at an angle with respect to the bottom walls 192 and 193 defined in both of members 181 and 182. Moreover, the bottom wall 194 of the channel defined in member 187 is located to position respective outer ends of the other pair of the mutually-spaced legs 63 and 64 of element 187 adjacent to the corresponding ends of first and second elements 184 and 185.

Still additionally included in connector 180 is yet a fourth elongated channel-shaped member 200 joined at one end to one end of each of members 184 and 185 and projecting laterally away from the aforesaid common plane but in a direction opposite member 187. The outer end portion of member 200 likewise is conformed in size and shape to seat within the outwardly opening cavity 68 defined between the one pair of mutually-spaced legs 71 and 72 of the end portion of still one more H-shaped element not in itself shown in the drawings but located to run in a direction also generally opposite the direction in which element 188 runs.

It will be observed that side walls 201 and 202 of member 200, as is the case with member 187, also are disposed in an angle with respect to bottom walls 192 and 193 of members 181 and 182. Once again, the bottom wall 203 will be located to position the respective outer ends of mutually-spaced legs 73 and 74 of the additionally connected element correspondingly adjacent to the respective outer ends of the corresponding legs 73 and 74 in respective ones of elements 181 and 182.

It will also be observed that the nearby ends of members 181 and 182 are joined together by what becomes a partial end wall 206 of the channel defined in member 187. That same approach preferably defines an end wall of the channel defined in member 200, although that is not visible in the drawings. As shown, those end walls 206 which join the side walls of respective elements 181 to 182 do not continue entirely into bottom wall 194 (or bottom wall 203 in the other case) but is of lesser height. It is shortened to provide a notch 208 which seats mitered lower feet 73 and 74 on element 188, and correspondingly in the case of element 200, in order to complete a neat mitered abuttment of the ends of all of elements 184, 185, and 188 and the oppositely directed counterpart of the latter.

Figure 5A:
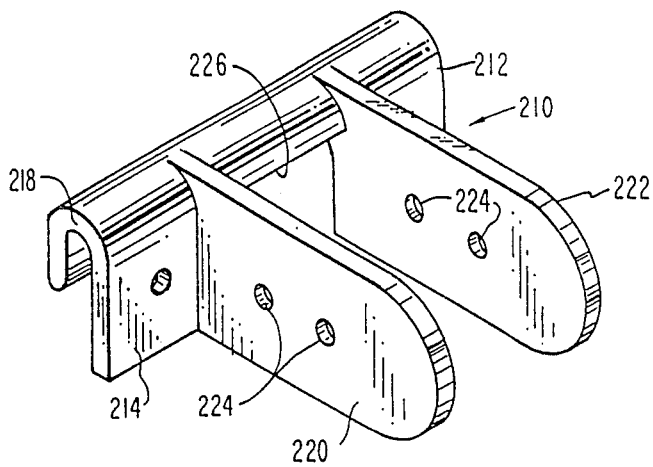
FIG. 5a is an isometric view of another coupling.
Figure 5B:
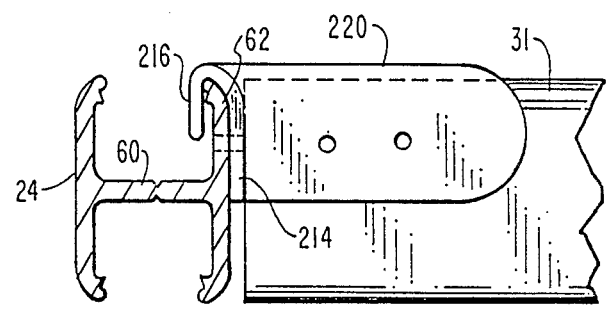
FIG. 5b is a side view of that coupling and also depicts interconnected elements one of which is shown in cross-section.
Figure 5C:
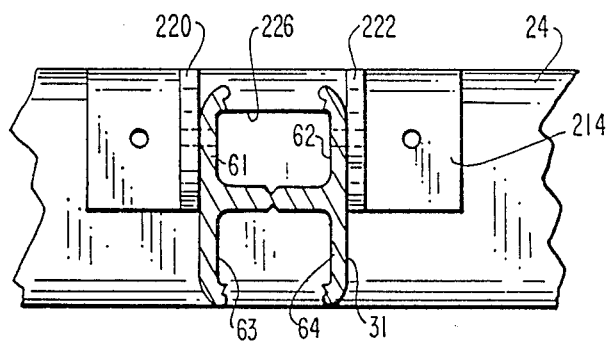
FIG. 5c is a front view of the coupling of FIG. 5a again depicting interconnected elements fragmentarily and with a different one of those elements taken in cross-section.

Still another coupling 210, shown in FIGS. 5a–5c, is constructed in order to afford a T-shaped coupling usable as at the joinder of element 31 to an intermediate portion of element 24 in FIG. 2b. Coupling 210 includes a member 212 of J-shaped cross-section disposed to hook over the outer end of a leg 62 of frame element 24. The longer leg 214 of member 212 lies alongside and aainst the outer surface of leg 62. The shorter leg 216 projects alongside the inner surface of leg 62, and is of a length as in FIG. 5d, disposed its free end against cross-bar 60 at the same time as the interior of the bight 218 in member 212 is disposed against the outer end of leg 62.

Projecting outwardly from and at an angle with respect to longer leg 214 are a pair of laterally-spaced parallel flat blades 220 and 222 joined to and disposed at an angle with respect to leg 214. Blades 220 and 222 are spaced apart a distance such that they snugly engage respective portions of the exterior side surfaces of individually different ones of the mutally-spaced legs of element 31. One or more openings 224 are defined in blades 220 and 222 in order to receive fasteners, such as the afore-depicted self-tapping screws, for securing the respective side walls of element 31 within blades 220 and 222.

Figure 5D:
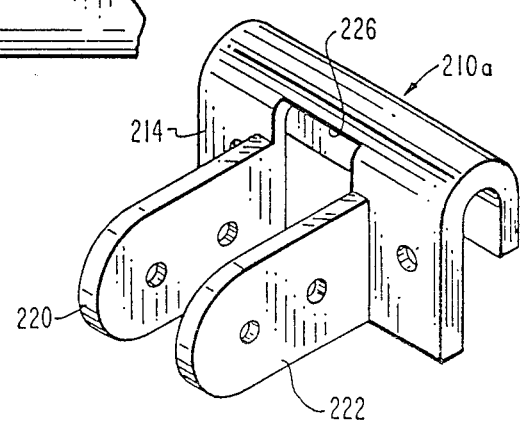

As shown in FIGS. 5a and 5b, the outer ends of the upwardly facing legs 61 and 62 of element 31 are positioned so as to be in alignment with the outer end of leg 62 of element 24. In this case, the upper edges of blades 220 and 222 are aligned with the top of bight 218 in coupling 212. However, an alternative is shown in FIG. 5d in which blades 220 and 222 are joined to leg 214 of member 210a, so that the bottom edges of blades 220 and 222 are aligned with the free end of leg 214.

Longer leg 214 of coupling 210 preferably is bifurcate to defined an opening 226 spanning the distance between blades 220 and 222. As shown in FIG. 5d, opening 226 is in alignment with what will be the free end of leg 62 of member 24, and the upper edges of blades 220 and 222 are situated below the upper edge of opening 226. In this case, the end of frame element 31 may be inserted to protrude into opening 226 and lie against leg 214 of coupling 210. On the other hand, as most clearly shown in FIG. 5b, opening 226 may have its upper edge disposed nearer to bight 218 or the opening may be deleted all together, with legs 220 and 222 abutting against leg 214. In FIG. 5b, the top leg ends of element 31 are disposed slightly below the upper edge of blades 220 and 222, so that the addition of a trimming welt, as previously shown in FIGS. 8 and 11, may be inserted between the upper legs of element 31 and thereby define together with the upper edges of blades 220 and 222 a smooth surface for the edge margin of a fabric approaching frame element 24. In any case, these different minor variations either shown or mentioned facilitate choice as between different exact positioning of the elements joined by such a T-shaped connector or coupling.

Furthermore, openings 224 need not be preformed or only one such opening may be included in each bar. In this way, element 31, or some other frame element substituted in its place, may be mounted and caused to be tilted either upwardly or downwardly, with suitable mitering, relative to the orientation of element 24 or some other element substituted for it. As shown, element 31 curves downwardly away from coupling 210. A different element in a given frame may be straight rather than curved as shown at the T-junctions included within the frame sketched in FIG. 1d.

FIGS. 6a–6d set forth a still different connector means or coupling for enabling a frame element 232 to be hingedly interconnected with another frame element 234 which in this case is in turn interconnected with a still further frame element 236. All of those frame elements in this case again have the above-described H-shaped cross-section which include legs 61 and 62 together with the formation of shoulders 78 on the interior surfaces of those legs.

With that overall combination, one associated component is an L-shaped device 238 constructed by joining a first channel-shaped member 244 at one end to a mating end of a second channel-shaped member 246. The free end portions of members 244 and 246 are inserted respectively in corresponding end portions of elements 234 and 236, thereby enabling the mitered connecting together of element 234 to element 236. Members 244 and 246 are conformed in size and shape so as to seat within the respective cavities 68 defined within each of members 234 and 236.

Also included is a hinge 248 composed of the combination of a hinge plate 250 and a hinge bar 252. Hinge bar 252 is channel-shaped and has a conformation as to seat within the cavity 68 defined between legs 61 and 62 of element 232 under captivation therein by shoulders 78. Spaced tabs 254 each project outwardly through the opening defined by the feet on the ends of legs 61 and 62. Included in each tab is a hinge sleeve 256.

Another hinge sleeve 262 is formed through an ear 264 which is joined to and projects outwardly away from hinge plate 250 to bring sleeve 262 into alignment with sleeves 256. Actually, only one tab is necessary, but two are preferred. Ear 264 is sandwiched between the tabs 254. A hinge pin 266 projects entirely through the aligned sleeves 262 and 256 and in this case is simply a bolt threaded only toward its outer end, so as to define a smooth bearing surface. As shown, hinge plate 250 is so located on the exterior side wall of frame element 234 as to be in a position to align the outer ends of the other pair of legs 63 and 64 of element 232 with the outer ends of the corresponding pair of the mutually-spaced legs of element 236.

Figure 7A:
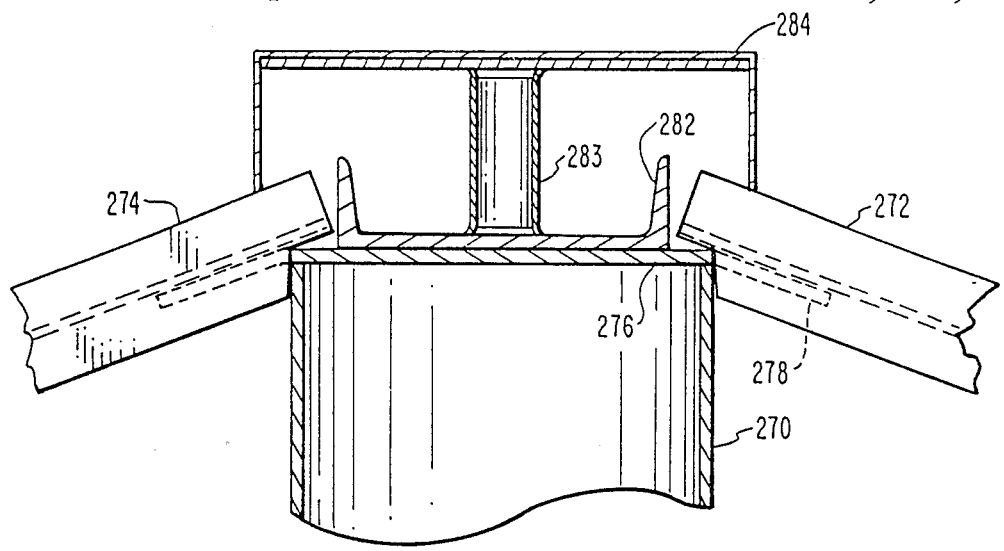
FIG. 7a is a fragmentary view, taken partly in cross-section, of an interconnecting and supporting structure for a canopy which may take the shape illustrated in FIG. 1j.
Figure 7B:
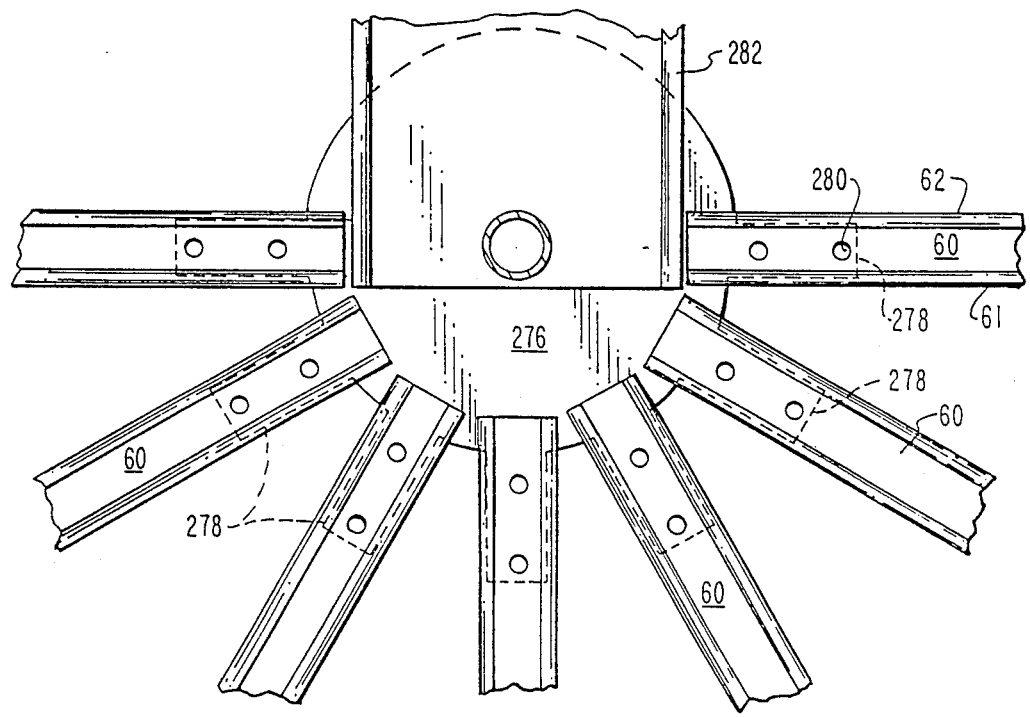
FIG. 7b is a framentary plan view of that shown in FIG. 7a with a flashing cap removed as well as indicating other components shown in FIG. 7a somewhat schematically.

A somewhat different approach is shown in FIGS. 7a and 7b which fragmentarially show different interconnections at the top of a vertical post 270 to enable the mounting of the upper-end portions of different elements such as 272 and 274 again preferably of the above-described H-shaped cross-section. The approach is useful, for example, in order to form the frame of an elongated canopy as sketched in FIG. 1i. In this case, a mounting plate 276 is secured atop the upper end of post 270 and from which a spaced plurality of tabs are joined to and project outwardly from successive positions along a semi-circular one end of the canopy. In this particular version, base plate 276 is elongated and continues throughout the central portion of the canopy of FIG. 1i as do a continuing succession of tabs 278 toward the other end of the canopy which is formed reciprocally to that which is thus shown in FIG. 7b.

Besides slanting downwardly so as to define the top of the canopy and then curving to the vertical so as to define the skirts thereof, each tab 278 has a width no greater than the internal spacing between one pair of the mutually-spaced legs in elements 272, 274 and the corresponding other elements. Thus, each tab projects from base plate 276 through one end of its associated one of elements 272, 274 and the rest, whereupon it is fastened to the lower surface of the crossbar 60 in each element by the use of nuts and bolts or other fasteners as indicated at 280.

Preferably also included is an elongated channel iron 282 which extends from one post 270 to the opposite such post at the other end of the canopy. Projecting upwardly and spaced along the length of channel iron 282 is secured a cap 284 which serves as a flashing for the upper end portions of each of elements 272 and 274. Cap 284 has been removed in FIG. 7b for clarity of presentation. It will be noted that a full circle of tabs 278 may be employed around the top of post 270 in order to form a round-skirted umbrella as sketched in FIG. 1j.

In all cases, the frame elements have been depicted in the preferred form of having an H-shaped cross-section. As has been adverted to above, several of the interconnecting or coupling elements in themselves only actually require that the element include a single U-shaped channel. Of course, an H-shaped cross-section is essentially the same thing as two U-shaped channels formed back to back and with a common bottom. Thus, the incorporation at least for some elements of simpler channels of U-shaped cross-section is contemplated but not considered to be as preferable for reasons already stated.

An analysis of the objects set forth in the introduction will reveal that each and every one of those objects have been met by the structures which have been described and shown. Certainly, not every conceivable canopy shape that might be imagined may have been fully accomodated, but the variety of shapes that are enabled constitute an enormous number.

In designing a particular canopy frame, it should be realized that the framework is going to be seen as silhouetted lines in the canopy fabric when backlighted at night. Those silhouetted lines should be arranged to become an acceptable part of the illuminated effect. Indeed, the necessary framework can actually be an attractive part of a design and may enhance the job if it is done well.

The fabric selected, usually of vinyl, should be of a good grade which does not excessively fade, mildew, be hard to keep clean or ultimately become brittle when exposed to the atmosphere. It may be noted that the basic fabric cover can never be any darker than the lightest color in the imprinting on the finished job, unless it was planned to cut into the background and sew graphics in place, a procedure not recommended.

By and large, fluorescent lighting will be the best selection for canopy illumination, employing high-output lamps, sockets and ballast. They should be designed for outdoor, cold weather use. However, certain shapes of canopies may lend themselves more to the use of metal vapor, metal halide or quartz lamps which might be more efficient in terms of cost and energy in some cases.

The spacing and distance from the surface of any translucent material such as the fabric here employed is a critical consideration in lighting the material evenly and with desired brilliance. When it is desired that the light be confined within the canopy itself and not be allowed to illuminate an underlying area, the lighting should be of an indirect type, such as by means of lamps disposed in a continuous header at the lower back side of the canopy. Even then, a certain amount of any such illumination will also bounce downwardly, off the inside of the vinyl cover, to a sidewalk below, for example. This yields a very nice, soft-lighting effect.

Whatever the source of illumination, it must be placed far enough away from the covering fabric to avoid the creation of so-called "hot-spots" where the lines of the lamp will show somewhat. This may be caused by locating lamps too close to the covering surface or arranging them with too great of an inter-lamp spacing. A rule-of-thumb is that the center-to-center spacing of the lamps should not exceed the distance of the lamps from the covering surface.

The variety of couplings shown for use as interconnecting means are in themselves sufficient to enable the formation of a large number of different canopy shapes. Based upon these exemplary versions, still others will suggest themselves. All of the illustrated couplings are capable of being secured by use of fasteners such as bolts, screws or rivets. Thus, the installer does not need to acquire and use welding equipment.

When feasible, however, the preferred interconnecting means are weldments. For the desired frame elements fabricated as aluminum extrusions, heliarc or analogous welding techniques are preferable. In making an early prototype of the version shown in FIGS. 2a and 2b, that approach yielded a canopy which was rugged and durable. Yet, all interconnections were smooth and neat in appearance. The use of welding, of course, also affords choice from an almost infinite selection of interconnecting angles and assortments.

While particular embodiments of the present invention have been shown and described, and various alternatives in the choices between several different components for a particular purpose have either been expressly presented or at least mentioned, it will be obvious to those skilled in the art that changes and further modifications may be made without departing from the invention in its broader aspects. Therefore, the aim in the appended claims is to cover all such changes and modifications as fall within the true spirit and scope of that which is patentable.

I claim:

1. In an assembly including a frame composed of a plurality of elongated elements interconnected to form a rigid array to which a stretchable fabric is secured and stretched, the combination comprising:

means for securing portions of said fabric into corresponding adjacent different ones of said elements and establishing a selectable degree of tension in said fabric;

means for connecting together the corresponding adjacent ends of respective ones of said elements to form said frame;

at least some of said elements each having space-opposed pairs of mutually-spaced legs projecting individually away from respective opposite ends of a crossbar joining said legs as to define with said legs an H-shaped cross-section to define a pair of space-opposed cavities into either one of which cavities said fabric is secured, said means for securing comprising means for drawing selected portions of said fabric into some of said space-opposed cavities thereby tensioning said fabric between said elements;

first and second elongated channel-shaped members, one end of said second member being joined to one end of said first member with the respective ones of the longitudinal axes of said members mutually defining an angle therebetween;

the end portion of each of said members opposite said one end being conformed in size and shape to seat within the outwardly-opening cavity defined between one pair of said mutually-spaced legs of one end portion of an individual one of a pair of said elements;

and means for securing the end portion of each of said members individually into corresponding ones of the end portions of said elements.

2. An assembly as defined in claim 1 which further includes a third elongated channel-shaped member joined at one end to the one end of each of said first and second members with said third member projecting laterally away from the plane defined by said axes of said first and second members;

and the end portion of said third member opposite its one end being conformed in size and shape to seat within the outwardly-opening cavity defined between one pair of said mutually-spaced legs of one end portion of another of said elements.

3. An assembly as defined in claim 2 in which the sidewalls of the channel defined in said third member are disposed at an angle with respect to the bottom walls defined in both of said first and second members, and in which the bottom wall of said channel in said third member is located to position the respective outer ends of the other pair of said mutually-spaced legs in said another element correspondingly adjacent to the respective outer ends of the other pair of said mutually-spaced legs in the corresponding ends of said first and second elements.

4. An assembly as defined in claim 3 in which said one ends of said first and second members are joined by an end wall of said channel defined in said third member.

5. An assembly as defined in claim 2 which further includes a fourth elongated channel-shaped member joined at one end of each of said first and second members with said fourth member projecting laterally away from said plane in a direction opposite said third member;

and the end portion of said fourth member opposite its one end being conformed in size and shape to seat within the outwardly opening cavity defined between one pair of said mutually-spaced legs of one end portion of a further one of said elements.

6. An assembly as defined in claim 5 in which the sidewalls of the channel defined in said fourth member are disposed at an angle with respect to the bottom walls defined in both of said first and second members, and in which the bottom wall of said channel in said fourth member is located to position the respective outer ends of the other pair of said mutually-spaced legs in said further element correspondingly adjacent to the respective outer ends of the other pair of said mutually-spaced legs in the corresponding ends of said first and second elements.

7. In an assembly including a frame composed of a plurality of elongated elements interconnected to form a rigid array to which a stretchable fabric is secured and stretched, the combination comprising:

means for securing portions of said fabric into corresponding adjacent different ones of said elements and establishing a selectable degree of tension in said fabric;

means for connecting together the corresponding adjacent ends of respective ones of said elements to form said frame;

at least some of said elements each having spaced-opposed pairs of mutually-spaced legs projecting individually away from respective opposite ends of a crossbar joining said legs as to define with said legs and H-shaped cross-section to define a pair of space-opposed cavities into either one of which cavities said fabric is secured, said means for securing comprising means for drawing selected portions of said fabric into some of said spaced-opposed cavities thereby tensioning said fabric between said elements;

an elongated member having a J-shaped cross-section disposed to hook over the outer end of one of said mutually-spaced legs of an intermediate portion of one of said elements with its longer leg lying alongside and against the outer surface of said one element and its shorter leg projecting alongside the inner surface of said one leg;

a pair of laterally-spaced parallel flat bars at one end joined to and projecting outwardly from and at an angle with respect to said longer leg, said bars being spaced apart to snugly engage respective end portions of the exterior surfaces of the individually different ones of the mutually-spaced legs of another of said elements;

and means for fastening said elements to said coupling.

8. An assembly as defined in claim 7 in which said other element is positioned to dispose the outer ends of its said mutually-spaced legs in alignment with the outer end of said one leg.

9. An assembly as defined in claim 7 in which the upper edge portions of each of said bars is disposed in alignment with the outer bottom surface portion of the bight in said J-shaped member.

10. An assembly as defined in claim 7 in which said shorter leg is of a length disposing its free end against said crossbar with the interior of the bight in said member disposed against said outer end of said one leg.

11. An assembly as defined in claim 7 in which a portion of said longer leg is bifurcated to define an opening between said bars, the edge of said opening adjacent to said bight being aligned with said outer end of said one leg.

12. In an assembly including a frame composed of a plurality of elongated elements interconnected to form a rigid array to which a stretchable fabric is secured and stretched, the combination comprising:

means for securing portions of said fabric into corresponding adjacent different ones of said elements and establishing a selectable degree of tension in said fabric;

means for connecting together the corresponding adjacent ends of respective ones of said elements to form said frame;

at least some of said elements each having space-opposed pairs of mutually-spaced legs projecting individually away from respective opposite ends of a crossbar joining said legs as to define with said legs an H-shaped cross-section to define a pair of space-opposed cavities into either one of which cavities said fabric is secured, said means for securing comprising means for drawing selected portions of said fabric into some of said space-opposed cavities thereby tensioning said fabric between said elements;

a hinge plate secured to a portion of one leg of said pairs of mutually-spaced legs of one of said elements;

a hinge bar having a channel-shaped member seated in the outwardly-opening cavity defined between one pair of said mutually-spaced legs in another of said elements;

means defining a first hinge sleeve joined to and projecting outwardly through the opening in said cavity from said hinge bar;

means defining a second hinge sleeve joined to and projecting outwardly away from said plate into alignment with said first sleeve;

and a hinge pin projecting through said first and second sleeves with said elements being disposed at a selected angle therebetween.

13. An assembly as defined in claim 12 in which said first sleeve includes at least one ear joined to and projecting outwardly from said opening in said cavity and having means defining an opening through said ear and aligned in reception of said pin, and in which said second sleeve includes a stub joined to and projecting outwardly from said plate and having means defining a hole disposed in alignment with said opening through said ear and through which said pin also is received.

14. An assembly as defined in claim 13 in which another ear spaced from said one ear also is joined to and projects outwardly from said bar and has means defining another opening therethrough and aligned with said hole in reception of said pin.

15. An assembly as defined in claim 12 and which includes means defining downwardly-facing shoulders individully on the interior sides of respective ones of said one pair of legs, of said other element, and in which said member is confined beneath said shoulders.

16. An assembly as defined in claim 12 which further includes a further one of said elements with an end portion thereof adjacent to an end portion of said one element;

another elongated channel-shaped member seated in the outwardly-opening cavity defined between one pair of said mutually spaced legs of said further element;

a further elongated channel-shaped member joined to one end of said other member and projecting at an angle away therefrom with said further member being seated in the outwardly opening cavity defined between one pair of the mutually-spaced legs of said one element.

17. An assembly as defined in claim 16 in which said hinge plate is located on said one element in a position to align the outer ends of the other pair of said other element with the outer ends of the other pair of mutually-spaced legs of of said further element.

18. In an assembly including a frame composed of a plurality of elongated elements interconnected to form a rigid array to which a stretchable fabric is secured and stretched, the combination comprising:

means for securing portions of said fabric into corresponding adjacent different ones of said elements and establishing a selectable degree of tension in said fabric;

means for connecting together the corresponding adjacent ends of respective ones of said elements to form said frame;

at least some of said elements each having space-opposed pairs of mutually-spaced legs projecting individually away from respective opposite ends of a crossbar joining said legs as to define with said legs an H-shaped cross-section to define a pair of space-opposed cavities into either one of which cavities said fabric is secured, said means for securing comprising means for drawing selected portions of said fabric into some of said space-opposed cavities thereby tensioning said fabric between said elements;

a first one of said elements;

another of said elements having one end joined to one end of said one element with said elements mutually oriented at an acute angle;

a further one of said elements having one end positionable adjacent to said one ends of said first and other elements;

and means for hingedly securing said further element to one of said first and other elements.

19. In an assembly including a frame composed of a plurality of elongated elements interconnected to form a rigid array to which a stretchable fabric is secured and stretched, the combination comprising:

means for securing portions of said fabric into corresponding adjacent different ones of said elements and establishing a selectable degree of tension in said fabric;

means for connecting together the corresponding adjacent ends of respective ones of said elements to form said frame;

at least some of said elements each having space-opposed pairs of mutually-spaced legs projecting individually away from respective opposite ends of a crossbar joining said legs as to define with said legs an H-shaped cross-section to define a pair of space-opposed cavities into either one of which cavities said fabric is secured, said means for securing comprising means for drawing selected portions of said fabric into some of said space-opposed cavities thereby tensioning said fabric between said elements;

a mounting base;

and a tab joined to and projecting outwardly from said mounting base with said tab having a width no greater than the internal spacing between one pair of said mutually-spaced legs of one of said elements and with said tab projecting from said plate through one end of said one element and fastened to the crossbar of said one element.

20. In an assembly including a frame composed of a plurality of elongated elements interconnected to form a rigid array to which a stretchable fabric is secured and stretched, the combination comprising:

means for securing portions of said fabric into corresponding different ones of said elements and establishing a selectable degree of tension in said fabric;

means for connecting together the corresponding adjacent ends of respective ones of said elements to form said frame;

and at least some of said elements each having space-opposed pairs of mutually-spaced side walls projecting individually away from respective opposite ends of a bottom wall joining said side walls as to define with said side walls a square channel-shaped cross-section to define a cavity into which said fabric is secured, said means for securing comprising means for drawing selected portions of said fabric into some of said cavities thereby tensioning said fabric between said elements;

first and second elongated channel-shaped members, one end of said second member being joined to one end of said first member with the respective ones of the longitudinal axes of said members mutually defining an angle therebetween;

the other end portion of each of said members opposite said one end being conformed in size and shape to seat wihin the outwardly opening cavity defined between the sidewalls of one end portion of an individual one of said first and second elements;

and means for securing the end portion of each of said members individually into corresponding ones of the end portions of said elements.

21. An assembly as defined in claim 20 which further includes a third elongated channel-shaped member joined at one end to the one end of each of said first and second members with said third member projecting laterally away from the plane defined by said axes of said first and second members;

and the other end portion of said third member opposite its one end being conformed in size and shape to seat within the outwardly-opening cavity defined between the sidewalls of one end portion of another of said elements.

22. An assembly as defined in claim 21 in which the sidewalls of the channel defined in said third member are disposed at an angle with respect to the bottom walls defined in both of said first and second members, and in which the bottom wall of said channel in said third member is located to position the respective outer ends of the sidewalls in said another element correspondingly adjacent to the respective outer ends of said sidewalls in the corresponding ends of said first and second elements.

23. An assembly as defined in claim 21 in which said one ends of said first and second members are joined by an end wall of said channel defined in said third member.

24. An assembly as defined in claim 20 which further includes a fourth elongated channel-shaped member joined at one end of each of said first and second members with said fourth member projecting laterally away from said plane in a direction opposite said third member;

and the other end portion of said fourth member opposite its one end being conformed in size and shape to seat within the outwardly opening cavity defined between the sidewalls of one end portion of a further one of said elements.

25. An assembly as defined in claim 24 in which the sidewalls of the channel defined in said fourth member are disposed at an angle with respect to the bottom walls defined in both of said first and second members, and in which the bottom wall of said channel in said fourth member is located to position the respective outer end portions of the sidewalls in said further element correspondingly adjacent to the respective outer ends of the sidewalls in the corresponding ends of said first and second elements.

26. In an assembly including a frame composed of a plurality of elongated elements interconnected to form a rigid array to which a stretchable fabric is secured and stretched, the combination comprising:

means for securing portions of said fabric into corresponding different ones of said elements and establishing a selectable degree of tension in said fabric;

means for connecting together the corresponding adjacent ends of respective ones of said elements to form said frame;

and at least some of said elements each having space-opposed pairs of mutually-spaced side walls projecting individually away from respective opposite ends of a bottom wall joining said side walls as to define with said side walls a square channel-shaped cross-section to define a cavity into which said fabric is secured, said means for securing comprising means for drawing selected portions of said fabric into some of said cavities thereby tensioning said fabric between said elements;

an elongated member having a J-shaped cross-section disposed to hook over the outer end of one of said sidewalls of an intermediate portion of one of said elements with its longer leg lying alongside and against the outer surface of said one element and its shorter leg projecting alongside the inner surface of said one sidewall;

a pair of laterally-spaced parallel flat bars at an end joined to and projecting outwardly from and at one angle with respect to said longer leg, said bars being spaced apart to snugly engage respective end portions of the exterior surfaces of the individually different ones of the sidewalls of another of said elements;

and means for fastening said elements to said coupling.

27. An assembly as defined in claim 26 in which said other element is positioned to dispose the outer ends of its sidewalls in alignment with the outer end of said one sidewall.

28. An assembly as defined in claim 26 in which the upper edge portions of each of said bars is disposed in alignment with the outer bottom surface portion of the bight in said J-shaped member.

29. An assembly as defined in claim 26 in which said shorter leg is of a length disposing its free end against said bottom wall with the interior of the bight in said member disposed against said outer end of said one sidewall.

30. An assembly as defined in claim 26 in which a portion of said longer leg is bifurcated to define an opening between said bars, the edge of said opening adjacent to said bight being aligned with said outer end of said one sidewall.

31. In an assembly including a frame composed of a plurality of elongated elements interconnected to form a rigid array to which a stretchable fabric is secured and stretched, the combination comprising:

means for securing portions of said fabric into corresponding different ones of said elements and establishing a selectable degree of tension in said fabric;

means for connecting together the corresponding adjacent ends of respective ones of said elements to form said frame;

and at least some of said elements each having space-opposed pairs of mutually-spaced side walls projecting individually away from respective opposite ends of a bottom wall joining said side walls as to define with said side walls a square channel-shaped cross-section to define a cavity into which said fabric is secured, said means for securing comprising means for drawing selected portions of said fabric into some of said cavities thereby tensioning said fabric between said elements;

a hinge plate secured to a portion of one sidewall of one of said elements;

a hinge bar having a channel-shaped member seated in the outwardly-opening cavity defined between the sidewalls in another of said elements;

means defining a first hinge sleeve joined to and projecting outwardly through the opening in said cavity from said hinge bar;

means defining a second hinge sleeve joined to and projecting outwardly away from said plate into alignment with said first sleeve;

and a hinge pin projecting through said first and second sleeves with said elements being disposed at a selected angle therebetween.

32. An assembly as defined in claim 31 in which said first sleeve includes at least one ear joined to and projecting outwardly from said opening in said cavity and having means defining an opening through said ear and aligned in reception of said pin, and in which said second sleeve includes a stub joined to and projecting outwardly from said plate and having means defining a hole disposed in alignment with said opening through said ear and through which said pin also is received.

33. An assembly as defined in claim 32 in which another ear spaced from said one ear also is joined to and projects outwardly from said bar and has means defining another opening therethrough and aligned with said hole in reception of said pin.

34. An assembly as defined in claim 31 and which includes means defining downwardly-facing shoulders individully on the interior sides of respective ones of said sidewalls of said other element, and in which said member is confined beneath said shoulders.

35. An assembly as defined in claim 31 which further includes a further one of said elements with an end portion thereof adjacent to an end portion of said one element;

another elongated channel-shaped member seated in the outwardly-opening cavity defined between the sidewalls of said further element;

a further elongated channel-shaped member joined to one end of said other member and projecting at an angle away therefrom with said further member being seated in the outwardly opening cavity defined between the sidewalls of said one element.

36. An assembly as defined in claim 35 in which said hinge plate is located on said one element in a position to align the bottom wall of the said other element with the bottom wall of said further element.

37. In an assembly including a frame composed of a plurality of elongated elements interconnected to form a rigid array to which a stretchable fabric is secured and stretched, the combination comprising:

means for securing portions of said fabric into corresponding different ones of said elements and establishing a selectable degree of tension in said fabric;

means for connecting together the corresponding adjacent ends of respective ones of said elements to form said frame;

and at least some of said elements each having space-opposed pairs of mutually-spaced side walls projecting individually away from respective opposite ends of a bottom wall joining said side walls as to define with said side walls a square channel-shaped cross-section to define a cavity into which said fabric is secured, said means for securing comprising means for drawing selected portions of said fabric into some of said cavities thereby tensioning said fabric between said elements;

a first one of said elements;

another of said elements having one end joined to one end of said one element with said elements mutually oriented at an acute angle;

a further one of said elements having one end positionable adjacent to said one ends of said first and other elements;

and means for hingedly securing said further element to one of said first and other elements.

38. In an assembly including a frame composed of a plurality of elongated elements interconnected to form a rigid array to which a stretchable fabric is secured and stretched, the combination comprising:

means for securing portions of said fabric into corresponding different ones of said elements and establishing a selectable degree of tension in said fabric;

means for connecting together the corresponding adjacent ends of respective ones of said elements to form said frame;

and at least some of said elements each having space-opposed pairs of mutually-spaced side walls projecting individually away from respective opposite ends of a bottom wall joining said side walls as to define with said side walls a square channel-shaped cross-section to define a cavity into which said fabric is secured, said means for securing comprising means for drawing selected portions of said fabric into some of said cavities thereby tensioning said fabric between said elements;

a mounting base;

and a tab projecting outwardly from said mounting base with said tab having a width no greater than the internal spacing between the sidewalls of one of said elements and with said tab projecting from said plate through one end of said one element and fastened to the bottom wall of said one element.

* * * * *

UNITED STATES PATENT OFFICE
CERTIFICATE OF CORRECTION

Patent No. 4,865,066          Dated September 12, 1989

Inventor(s) Jackson R. Brooks

It is certified that error appears in the above-identified patent and that said Letters Patent is hereby corrected as shown below:

Column 12, line 10: "disposed" should read -- disposing --.

Column 12, line 20: "mutally-spaced" should read -- mutually-spaced --.

Column 12, line 36: "bifurcate" should read -- bifurcated --.

Column 12, line 37: "defined" should read -- define --.

Signed and Sealed this

Seventh Day of August, 1990

*Attest:*

HARRY F. MANBECK, JR.

*Attesting Officer*          *Commissioner of Patents and Trademarks*